United States Patent
Heydlauf

(10) Patent No.: US 10,884,572 B2
(45) Date of Patent: Jan. 5, 2021

(54) WINDOWING SYSTEM AND METHOD FOR COMPANION SOFTWARE PRODUCTS

(71) Applicant: Siemens Healthcare Diagnostics Inc., Tarrytown, NY (US)

(72) Inventor: Michael Heydlauf, Cary, NC (US)

(73) Assignee: Siemens Healthcare Diagnostics Inc., Tarrytown, NY (US)

(*) Notice: Subject to any disclaimer, the term of this patent is extended or adjusted under 35 U.S.C. 154(b) by 14 days.

(21) Appl. No.: 16/002,040

(22) Filed: Jun. 7, 2018

(65) Prior Publication Data

US 2018/0284952 A1 Oct. 4, 2018

Related U.S. Application Data

(63) Continuation of application No. 14/767,360, filed as application No. PCT/US2014/020088 on Mar. 4, 2014, now Pat. No. 10,007,392.

(60) Provisional application No. 61/789,362, filed on Mar. 15, 2013.

(51) Int. Cl.
   *G06F 3/048* (2013.01)
   *G06F 3/0481* (2013.01)
   *G06F 9/451* (2018.01)
   *G06F 3/01* (2006.01)

(52) U.S. Cl.
   CPC ............ *G06F 3/0481* (2013.01); *G06F 9/451* (2018.02)

(58) Field of Classification Search
   CPC ....... G06F 3/0481; G06F 9/451; G06F 3/0482
   See application file for complete search history.

(56) References Cited

U.S. PATENT DOCUMENTS

| | | | |
|---|---|---|---|
| 5,196,838 A | | 3/1993 | Meier et al. |
| 5,305,435 A | | 4/1994 | Bronson |
| 5,561,757 A | * | 10/1996 | Southgate ............. G06F 3/0481 715/790 |
| 5,712,995 A | * | 1/1998 | Cohn .................... G06F 3/0481 715/792 |
| 5,790,120 A | | 8/1998 | Lozares |
| 5,796,402 A | * | 8/1998 | Ellison-Taylor ......... G09G 5/14 715/792 |
| 5,838,318 A | * | 11/1998 | Porter ................... G06F 3/0481 715/790 |
| 5,874,962 A | * | 2/1999 | de Judicibus ......... G06F 3/0481 715/789 |
| 6,005,579 A | | 12/1999 | Sugiyama |

(Continued)

OTHER PUBLICATIONS

Smith et al., GroupBar: The TaskBar Evolved, Conference for Computer-Human Interaction, Special Interest Group of the Human Factors Society of Australia, pp. 1-10, (2003).

(Continued)

*Primary Examiner* — Nicholas Augustine

(57) ABSTRACT

Windows corresponding to independent applications in a windowed computing environment can be linked to have unified behavior. A host application can monitor window activity to determine if windows are intended to be grouped. Commands applied to one or more windows in a group are applied to at least some other windows in the group. Windows can be grouped or ungrouped according to various criteria including a priori configuration or user action. The window grouping permits a unified user interface behavior to be established for two or more independent applications.

22 Claims, 3 Drawing Sheets

(56) References Cited

U.S. PATENT DOCUMENTS

| | | | | |
|---|---|---|---|---|
| 6,008,809 | A * | 12/1999 | Brooks | G06F 3/0481 715/792 |
| 6,075,531 | A * | 6/2000 | DeStefano | G06F 3/04812 715/788 |
| 6,188,405 | B1 * | 2/2001 | Czerwinski | G06F 3/0481 715/764 |
| 6,486,898 | B1 * | 11/2002 | Martino | G06F 16/38 715/853 |
| 6,544,295 | B1 | 4/2003 | Bodnar | |
| 6,708,211 | B1 | 3/2004 | Tingley et al. | |
| 6,717,596 | B1 | 4/2004 | Nason | |
| 6,756,999 | B2 | 6/2004 | Stoakley | |
| 7,010,755 | B2 | 3/2006 | Anderson | |
| 7,124,373 | B1 | 10/2006 | Patil | |
| 7,181,687 | B2 | 2/2007 | Tai | |
| 7,257,777 | B1 * | 8/2007 | Kanevsky | G06F 9/451 715/794 |
| 7,490,297 | B2 * | 2/2009 | Bates | G06F 3/04855 715/764 |
| 7,581,192 | B2 | 8/2009 | Stabb et al. | |
| 7,660,817 | B2 | 2/2010 | Smith | |
| 7,913,183 | B2 | 3/2011 | Czerwisnki | |
| 2004/0066407 | A1 | 4/2004 | Regan et al. | |
| 2004/0066414 | A1 * | 4/2004 | Czerwinski | G06F 3/0481 715/781 |
| 2005/0216918 | A1 | 9/2005 | Kuraishi | |
| 2010/0005396 | A1 * | 1/2010 | Nason | G06F 21/84 715/746 |
| 2010/0153399 | A1 | 6/2010 | Oliver et al. | |
| 2012/0079419 | A1 | 3/2012 | Ajitomi et al. | |

OTHER PUBLICATIONS

Robertson et al., Scalable Fabric: Flexible Task Management, Avi'04 International Conference on Advanced Visual Interfaces; pp. 85-89, (2004).

International Search Report for PCT/US2014/020088 dated Jan. 2, 2015.

* cited by examiner

WINDOWING SYSTEM AND METHOD FOR COMPANION SOFTWARE PRODUCTS

BACKGROUND

Windowed graphical user interfaces (GUIs) provide a popular and well known display metaphor for a user to interact with an operating system of a computer device. A typical windowed GUI provides a basic background, sometimes referred to as a desktop, within which visual cues, such as icons or windowed applications, are available for user interaction. The operating system of the computer device uses the window metaphor to permit a user to open and interact with a number of child windows within the desktop or main application window. The child windows can be of several different types, and take on many shapes and forms, which often depend on their underlying application or purpose. In general, child windows represent separate applications and can be manipulated independently by the user. For example, they can separately be resized, moved, minimized, maximized, restored, closed and subject to other user manipulations in accordance with the metaphor of a windowed environment.

Some software applications may be operated in a separate parent window that has one or more child windows that may or may not be restricted by the confines of the parent window. Sometimes, child windows can be implemented within the context of a parent application window, so that the child windows move, minimize and close with the parent window, for example.

This feature of having a parent-child windowed relationship provides a useful metaphor for the user, where the associated windows of an application are managed as a group. For example, the windows that are managed as a group in a parent-child relationship are often conceptually unified by a common theme, such as a task or application. The user may select a window or group of windows for input, sometimes referred to as receiving the focus, and may expect that selection to reflect a particular concept, such as conducting a search or performing data entry.

Accordingly, a windowed application that does not have the focus would not be expected to have child windows that would receive the focus, so that the behavior of the application as a cohesive unit is maintained. In this way, the child windows appear to exhibit the same behavior that the parent window exhibits. If this were not the case, and child windows exhibited independent behavior from that of the parent, the user experience would be fragmented and disjointed. For example, the user may become confused or frustrated if a child window of an application was manipulated separately from the main application window.

SUMMARY

In accordance with aspects of the present disclosure, windows representing independent applications in a windowed computing environment can be linked to each other to have at least some unified behaviors. A host application can monitor window activity from different, independent applications to determine if windows are intended to be grouped. Commands applied to one or more windows in a group are applied to at least some other windows in the group. Windows of independent applications can be grouped or ungrouped according to various criteria including a priori configuration or user action. The grouped windows permit a unified user interface behavior to be established for two or more independent applications.

According to an aspect, a host application monitors window statuses of distinct applications to determine if window border areas are aligned for a certain period of time. If so, the host application identifies the alignment as a request to group the windows together to have a unified behavior. Actions applied to one window in such a grouping are applied by the host application to at least some or all of the windows in the group.

Accordingly, windows in the group that represent at least some independent applications appear to behave as a cohesive unit for a number of window manipulations, such as moving, minimizing, maximizing and restoring, as examples. A window can be removed from the group, such as by closing the window and/or by executing a removal command to disassociate the window from the group.

According to another aspect of the present disclosure, independent applications can register with a host application to permit windows from the different registered independent applications to be available for grouping with each other and/or with the host application. The host application can serve as base display to which the windows of the separate registered applications can be docked. The host application can display a framework for organizing the registered applications, which can include one or more launch buttons for launching windows of corresponding registered applications. Actuation of a launch button causes the corresponding independent application to be started with one or more corresponding windows being opened at defined locations.

The windows of separate independent applications that are registered with the host application can be treated with the same behavior that results from commands being applied to windows of the host application and/or other individual independent applications registered with the host application. An independent application can be deregistered with the host application to eliminate the window(s) of the independent application from the group managed by the host application. Alternately, or in addition, an independent application can remain registered with the host application, and the windows of the registered application can be removed from the grouping, so that they can behave independently of the windows in the grouping that are associated with other registered applications.

BRIEF DESCRIPTION OF THE SEVERAL VIEWS OF THE DRAWINGS

The present disclosure is described in greater detail below, with reference to the accompanying drawings, in which.

DETAILED DESCRIPTION

The present disclosure provides systems and methods for managing independent windowed applications as a cohesive group. The grouped windows that are managed together have common behaviors and characteristics with regard to the user interface experience, while the applications operating in those windows can be independent of each other. For example, the windows that are managed in a group in accordance with the present disclosure can all be minimized, maximized, moved and/or restored concurrently by executing a command on one of the windows in the group. Any type of behavior that is common to each window of the grouped windows can be used to assign behavior to the windows as a group. Accordingly, although some common window manipulations are mentioned above, the behavior of the individual windows or the grouped windows is not so limited.

Figure 1:
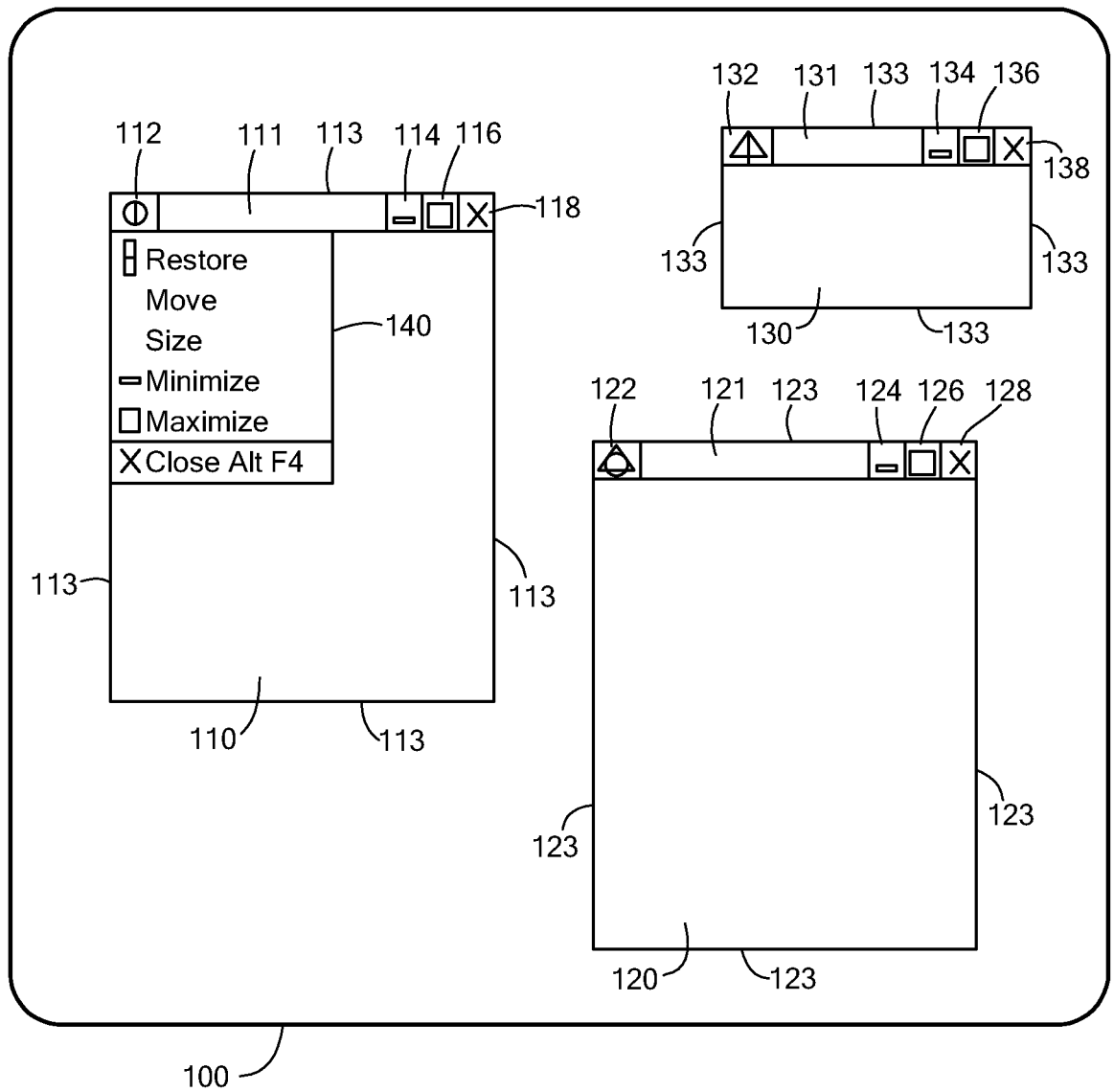
FIG. 1 is a block diagram of a user interface showing several windows.

Referring now to FIG. 1, a display 100 is illustrated with three windows 110, 120 and 130, each representing three separate and independent applications. Windows 110, 120 and 130 each have common features that can be used to manipulate the windows in display 100. For example, window 110 includes an application control button 112, window 120 has an application control button 122 and window 130 has an application control button 132. Each of buttons 112, 122 and 132 are distinct for their respective windows, and are associated with the distinct and independent applications represented by windows 110, 120 and 130. Buttons 112, 122 and 132 can each be actuated with a pointing device, such as a mouse cursor under the control of a user, to obtain a menu of commands for manipulating the respective windows. Window 110 illustrates a drop down menu 140 that is presented upon actuation of button 112. Menu 140 includes various commands that can be selected by the user, using a pointing device or key strokes, to manipulate window 110. For example, using the commands available in menu 140, a user can restore, move, size, minimize, maximize or close window 110.

The operations provided in response to the commands provided in menu 140 can also be executed by selection of other portions of window 110. For example, window 110 also includes a minimize button 114, a maximize (or restore, depending on context) button 116 and a close button 118 that, upon actuation, perform the respective commands on window 110. Window 120 has similar features for manipulation, including a minimize button 124, a maximize button 126 and a close button 128. Likewise, window 130 has a minimize button 134, a maximize button 136 and a close button 138.

In addition to the command buttons discussed above, each of windows 110, 120 and 130 can be repositioned or resized within display 100. For example, window 110 includes a title bar 111, window 120 includes a title bar 121 and window 130 includes a title bar 131, each of which can be selected by a user with a mouse button being held down to drag the window to a different position in display 100. In addition, each of windows 110, 120 and 130 can be resized using a respective border area 113, 123 or 133, by holding down a mouse button on a given border area and dragging the border area to a new location.

As illustrated above, there are numerous common behavior commands that can be implemented on windows 110, 120 and 130, which behaviors can be implemented according to various user interface techniques, including, for example, selecting a button, e.g., minimize button 114, or selecting a menu item in menu 140. Although windows 110, 120 and 130 represent separate and independent applications, their behavior is in accordance with common features and commands, based on window manipulation conventions.

In accordance with an exemplary embodiment of the present disclosure, two or more of windows 110, 120 and/or 130 can be attached or docked together to be managed as a unit. The group of windows that can be managed as a unit can be modified by attaching or docking more windows to windows already in the group, and windows can be removed from the group by detaching or undocking windows that are already members of the group. Two or more windows that are grouped together can be manipulated in accordance with common actions or commands, such as by being moved, minimized, maximized or restored, so that the windows in the group behave as a cohesive unit from the viewpoint of the user.

Figure 2:
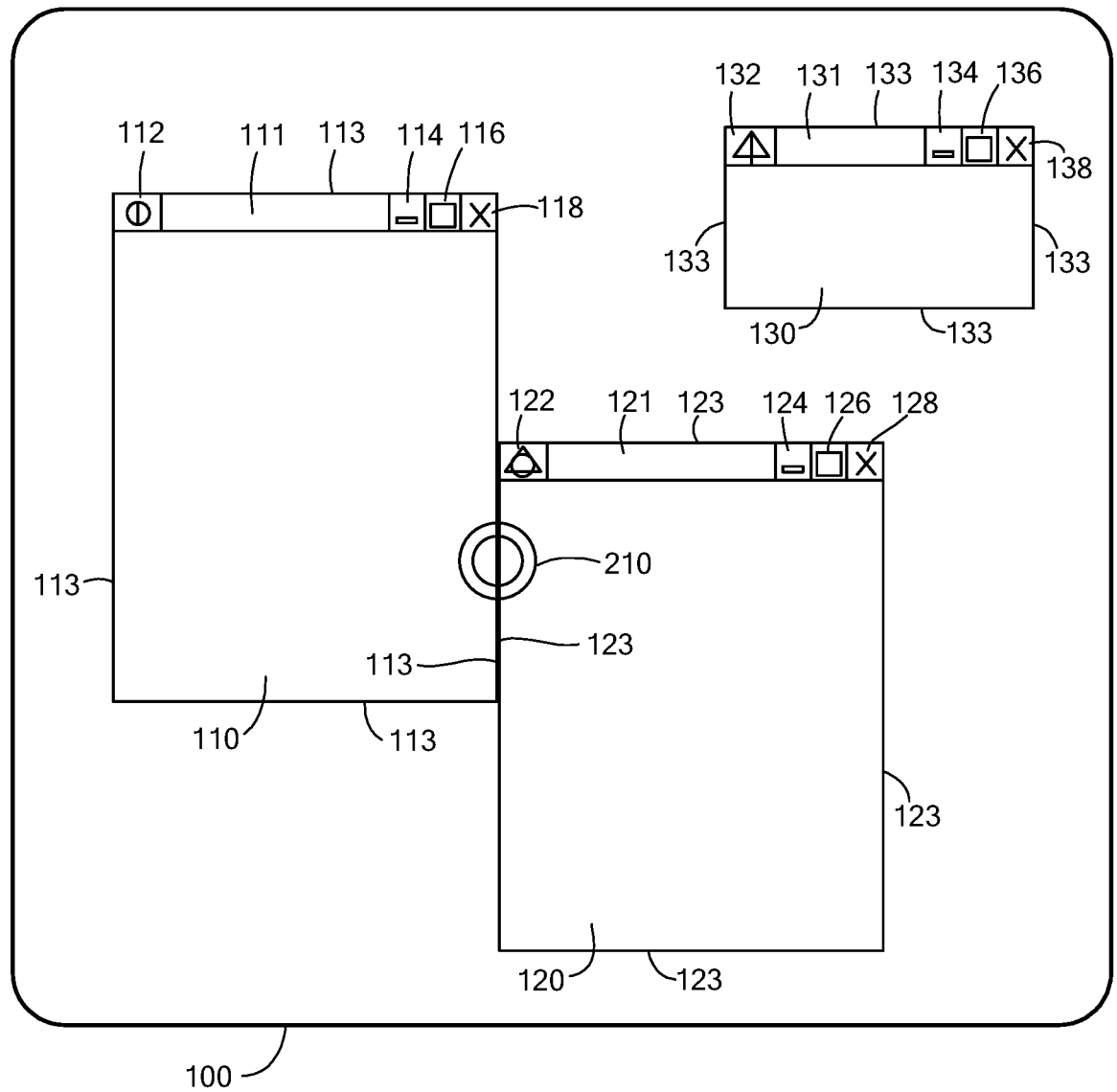
FIG. 2 is a block diagram illustrating window grouping operations in accordance with an exemplary embodiment of the present disclosure.

Referring to FIG. 2, window 120 is shown being joined to window 110 in accordance with an exemplary embodiment of the present disclosure. As illustrated in FIG. 2, window 120 is selected and moved by the user in display 100, such as by the user selecting title bar 123 and dragging window 120 towards window 110. As border area 123 of window 120 approaches border area 113 of window 110, a mechanism in accordance with the present disclosure is activated to attach or dock window 110 with window 120. The activated mechanism (not shown) causes windows 110 and 120 to be treated as a unified group, so that commands that are provided to either one of windows 110, 120 are implemented on all windows in the group. An indication, which can be a visual indication, such as visual indication 210, can be used to inform the user that a docking or attaching operation is underway to cause windows 110 and 120 to be grouped together for unified usage. Indication 210 can be temporarily displayed to show the docking or attaching operation, or can be persistent to indicate that windows 110 and 120 are joined in an attached or docked relationship.

Once windows 110 and 120 are grouped together in accordance with the present disclosure, commands provided to either one of windows 110, 120 are implemented on both of windows 110, 120. For example, if a user selects minimize button 124 of window 120, both of windows 110 and 120 are minimized in response. If window 110 is restored, such as may occur when window 110 is selected from a task bar in a minimized state, window 120 is also restored as a member of the group to which windows 110 and 120 belong as a result of the attachment or docking activity and operations. In accordance with this feature, restored windows have the same positional relationship as was the case prior to their being minimized, in accordance with how they were attached or docked.

Similarly, if window 120 is selected from the background to be brought to the foreground, window 110 is likewise brought to the foreground with window 120. In general, any type of behavior that is common to each of windows 110, 120 can be applied to all the windows concurrently as a group, so that formerly independent applications and their windows can be treated as a cohesive unit with regard to window behavior and manipulation.

In the example illustrated in FIG. 2, window 130 can be dragged to a border area 123 or 113 of respective windows 120 or 110, to also be joined and connected or docked with the group consisting of windows 110, 120. In general, any number of windows can be assigned to a given group by manipulating the windows in the user interface to be brought close to a border of a window that is part of the group. Manipulating the windows can include resizing a window by dragging a border closer to a border of another window. Similarly, one, several or all of a group of windows can be manipulated such as by collectively moving the group such that at least one window border is close to a border of a window to join that window to the group. The docking or attachment of windows can be implemented along any of the border areas of the window or group joining another window or group. For example, in FIG. 2, window 130 can be brought close to a top border area 113 of window 110, so that windows 130 and 110 are attached or docked at a portion of a bottom border area 133 of window 130 and a top border area 113 of window 110.

Windows can be attached or docked in a group so that some windows overlap other windows in attaching or docking to a common window border area. In addition, the configuration of the group of windows with regard to position or members of the group, for example, can be preserved or made persistent, so that restarting an application also restarts or associates already open applications that are part of the group with the windows in the group in their configured positions. Groups of windows can also be attached or docked with each other to become a single group.

Windows can be disassociated from a group, such as by closing an individual window. In addition, or alternately, windows can be disassociated from a group by executing a disassociation command, such as may be implemented by pressing a special key, such as a control key, on a keyboard while dragging a window away from the window or group to which it is attached or docked.

Figure 3:
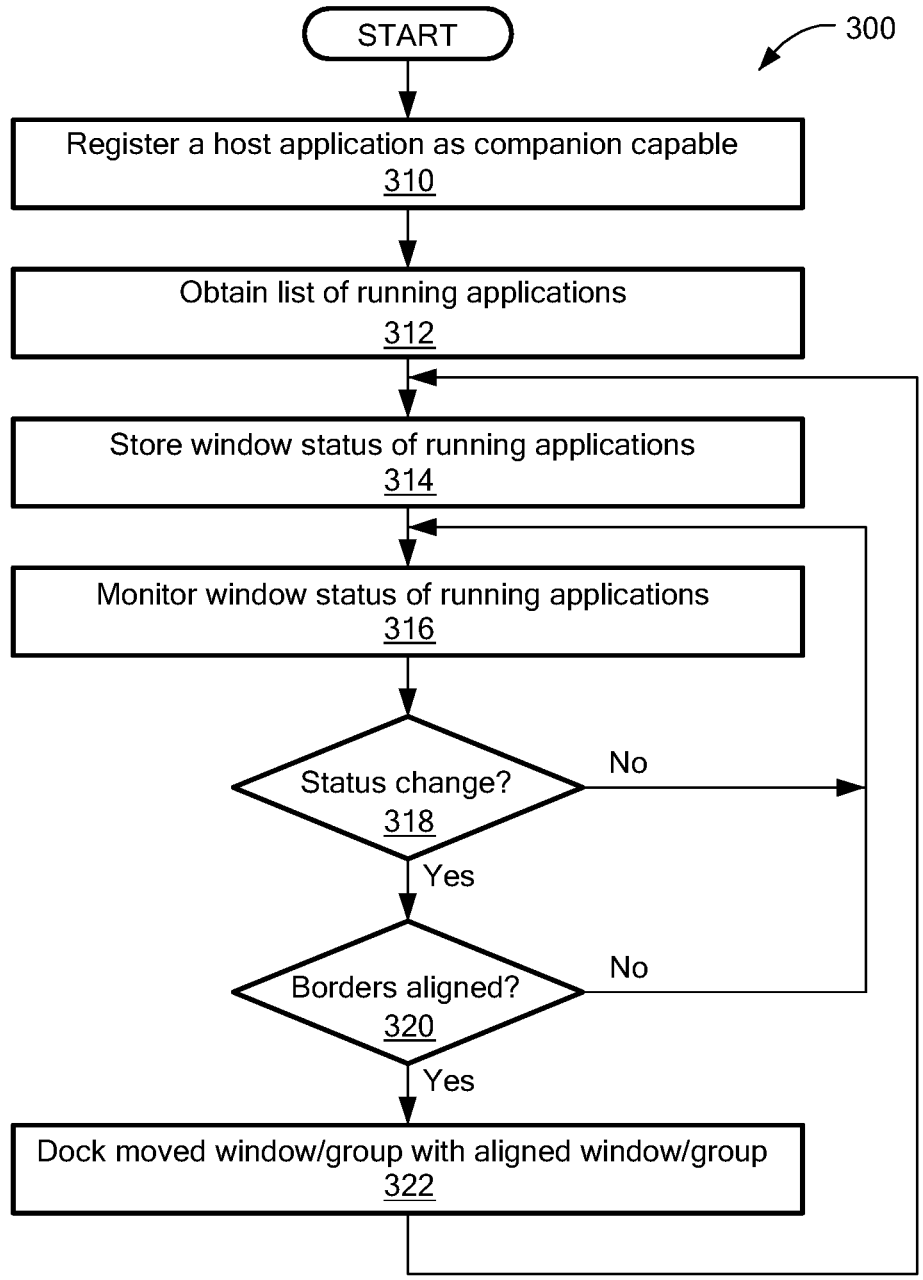
FIG. 3 is a flowchart illustrating an exemplary embodiment of the present disclosure.

Referring now to FIG. 3, a flowchart 300 illustrates an exemplary embodiment of the present disclosure. The process illustrated in flowchart 300 begins with the registration of a host application as being capable of providing companion features in accordance with the present disclosure. The companion features may include attachment or docking operations, as well as disassociation or undocking features. The host application may or may not be presented or visible in a user interface display, such as display 100 in FIGS. 1 and 2. The host application can be used as a platform for implementing the present disclosure in a computer system, such as by serving as a process or thread in which software that carries out the functions of the present disclosure can be housed or implemented. The host application can identify and manage applications or windows as a group, and can itself be one of the applications in the group.

The host application can track applications or windows within a group in accordance with various paradigms or configurations, such as through the use of an operating system registry, a semaphore or flag system or a configuration file that may be used to identify the grouped applications/windows. The paradigm used can be persistent so that the application or window groups are maintained through power cycles or operating system restarts.

Registration of the host application can be made automatic, such as by having the operating system of the computer identify an application or window as a host application that is companion capable. Alternately, or in addition, the host application can be identified manually, such as by having a user set a configuration for the host application to indicate that it is companion capable. In accordance with an exemplary embodiment, the host application can be loaded upon computer or operating system startup so that the host application is initially running as a process or thread. The host application can be presented to the user visually in the user interface, or maintained as an internal process or thread. The host application can be activated or controlled by events registered in the computer system, such as by a user selecting the host application to be loaded or to become active. Alternatively, or in addition, a user can edit a configuration file that activates the host application or makes the host application companion capable.

Once the host application is registered or otherwise active, it can obtain a list of independently running applications, as indicated in block 312 of flowchart 300. The list of independently running applications can be obtained by the host application submitting a query to the operating system to identify all window processes that are currently running. For example, the host application can issue a "get processes" command that returns an identifier, such as a window handle, for each currently open or active window process in the system. Upon obtaining an identifier for each window process, the host application can store the window status of each of the independently running applications, as indicated in block 314 of flowchart 300. The stored window status can include information about the size, position or activity of a window, for example, as well as a number of other parameters related to the current status of windows representing the independently running applications in the user interface.

Once the status of the independently running applications is stored, the host application monitors the window status of the independently running applications, as is illustrated in block 316 of flowchart 300. The monitored window status can be checked or updated on an event basis, such may be determined by user interaction with a windowed application, for example by giving a window the focus of the user interface. The status can also be monitored on a polling basis, where the host application reviews the status of each independently running window application on a regular basis for changes in status. For example, the host application can check the status of each independently running window application on the order of ten times a second, or any other suitable interval, which may/may not be regular or periodic. According to exemplary embodiment, the host application can make operating system calls using the identifiers, such as window handles, for each of the independently running window applications. The host application may, for example, issue a "get_window_rec" call for a specified window application using the associated window handle to determine the status of the window or "rectangle." The information returned from the operating system call can indicate window status, including such items as the position of the window, size of the window, whether the window is being moved, and other information that describes the situation of the window in the operating system.

The host application determines if there is a change in status for any of the windows being monitored, as illustrated in decision block 318. The determination of a status change can be implemented by comparing a current status, such as may be obtained through a call using the window handle as described above, with the stored window status for the window under inspection. If the status of a window has not changed, the host application continues to monitor the window status of the running window applications, as illustrated with the "no" branch of decision block 318 returning to reenter block 316 in flowchart 300.

If the window status of a window under inspection has changed, the host application determines whether the window under inspection has a border that is close to and/or aligned with a border of another window displayed in the user interface. This determination is illustrated in decision block 320 of flowchart 300. If the host application determines that the borders of the two windows are not close and/or aligned, the host application continues to monitor the window status of the independently running applications, as illustrated with the "no" branch of decision block 320 returning to reenter block 316 of flowchart 300.

The host application can determine the alignment of window border areas, such as areas 113, 123 and/or 133 of FIGS. 1 and 2, by comparing a distance between border areas with a particular or dynamic threshold. The threshold can be used to set a distance between border areas, beyond which borders are considered to be nonaligned, and not beyond which borders are considered aligned.

The host application may also use various criteria to determine if an attachment or a docking action should occur, such as by determining that the borders of two windows are aligned within a given range of distances for a certain amount of time. For example, if the borders of two windows are brought together within a quarter of an inch of each other for one second or more, the host application can consider the status of the windows to be a request for attachment or docking of the windows. The determination of the docking request is illustrated with the "yes" branch of decision block 320, which enters block 322 of flowchart 300.

Once the attachment or docking operation occurs, the host application identifies the two windows as being attached or docked, so that their behavior can be managed as a unit with regard to at least some of the common behaviors of the windows, even though the windows represent independently running applications. The window handles of the attached or docked windows can be maintained by the host application using a list, so that their status can continue to be monitored, for example.

The host application then continues to monitor the status of the windows in the user interface, and can detect a command provided to a window that is listed in a group of windows, which command the host application can promulgate to all windows in the group in accordance with their inclusion in the list maintained by the host application. Thus, for example, if the user initiates a minimize command for a window that is part of a group, in accordance with the present disclosure, the host application detects the command being applied to one member of a group, and causes a minimize command to be applied to all the windows in the group. Similarly, if the host application detects that the user has initiated a movement or repositioning command on one of the windows in the group, such as by monitoring the window status as discussed above, the host application can implement the same movement or repositioning command on all of the windows in the group, so that the group of windows all move together and appear to behave as a unit when commands are applied to one of the windows in the group.

According to an exemplary embodiment of the present disclosure, the host application can be configured to be visible to the user in the user interface. In addition, the host application can be configured to have launch buttons that open windows that may or may not belong to a group that the host application manages. The launch buttons can be provided to the host application when windows or applications are registered with the host application as companion windows or applications, which may be done by automatic or manual configuration, or by attaching or docking windows or applications, as described above. The registered windows or applications can then be started with the launch buttons in the host application, and can be positioned in accordance with their position configuration within the group. The host application may also be configured to store one or more scaling variables that can be used to scale windows in a group upon one of the windows in the group being resized.

The host application can also serve as base display to which the windows of the separate registered applications can be docked. The host application can display a framework for organizing the registered applications, which can include one or more of the launch buttons for launching windows of corresponding registered applications. Actuation of a launch button causes the corresponding independent application to be started with one or more corresponding windows being opened at defined locations.

An independent application can be deregistered with the host application to eliminate the window(s) of the independent application from the group managed by the host application. In such an event, a corresponding launch button can be removed from the host application.

Alternately, or in addition, an independent application can remain registered with the host application, and the windows of the registered application can be removed from the grouping, so that they can behave independently of the windows in the grouping that are associated with other registered applications. Such a configuration can be achieved by providing a flag or other indication in the host application display, for example, that indicates whether the window(s) of a given registered independent application should be grouped with the host application display or not.

According to another exemplary embodiment, windows in a group need not be aligned on border areas. For example, the windows may have a specified separation or position, while still being managed in concert. Such a situation may be useful if it were desired to have windows in a group that were located at different corners of a display, for instance. The windows of a group can also be auto-arranged, whereby their location with respect to each other and/or the host application can be set according to some convention, such as regular spacing or a grid layout. Group windows can also overlap each other, and can be tiled, where windows in the group can each be selected to be brought to the foreground.

As discussed above, the host application can retain data on window status, whether or not a window is made part of a group that does/does not include the host application. In addition, the host application can delete or remove data related to a window that is disassociated with a group. Furthermore, a window that is part of a group can be maintained a part of the group or not when the window is individually closed. Restoring or reopening an application window can restore its attached or docked state and relative position, or not. The same is true for the host application, which can dissolve a group of windows upon being closed or deactivated, or can retain the status of the window group upon being closed or deactivated. Each of the above configurations can be provided to the user as choice for how the companion window system should operate in accordance with user preferences.

The operations depicted and/or described herein are purely exemplary and imply no particular order. Further, the operations can be used in any sequence when appropriate and can be partially used. With the above embodiments in mind, it should be understood that they can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations depicted and/or described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed systems and methods can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of this disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the disclosure.

What is claimed is:

1. A system for managing windows in a computer system comprising at least one display, at least one user interface and a processor executing instructions from a memory to:
   load a host application into memory and display a first window associated with the host application in the user interface;
   detect an input to the host application to launch an independent application that is grouped with the host application;
   launch the independent application and display a second window associated with the independent application in the user interface in accordance with one or more of stored window location or stored window size information referenced by the host application within the memory;
   detect an operation being applied by a user to either of the first window associated with the host application or the second window associated with the independent application; and
   apply the operation to at least the other of the first window associated with the host application or the second window associated with the independent application,
   wherein the operation is selected from the group consisting of moving, minimizing, maximizing, restoring, and closing the respective applications.

2. The system of claim 1, the at least one display for selectively displaying the first window associated with the host application and the second window associated with the independent application.

3. The system of claim 1, wherein the processor is further for executing instructions from the memory to provide a launch button in association with the host application for launching the independent application.

4. The system of claim 1, wherein the processor is further for executing instructions from the memory to provide a launch button in association with the host application for launching an independent application that is not grouped with the host application.

5. The system of claim 1, wherein the processor is further for executing instructions from the memory for referring to scaling variables stored in the memory in implementing a user applied minimizing or maximizing operation.

6. The system of claim 1, wherein the processor is further for executing instructions from the memory to detect an independent application disassociation command being applied by the user and to ungroup the independent application from the host application in response thereto.

7. The system of claim 6, wherein the processor is further for executing instructions from the memory to detect the independent application disassociation command in response to the user depressing a predefined key on a keyboard and simultaneously moving the window associated with the independent application.

8. The system of claim 1, wherein the processor is further for executing instructions from the memory to store a window status of each of the first window and the second window.

9. The system of claim 8, wherein the window status is selected from at least one of the group consisting of the size, the position, and the activity of the respective window.

10. The system of claim 8, wherein the processor is further for executing instructions from the memory to compare the current status of the first window or the second window to a respective stored window status.

11. The system of claim 10, wherein the processor is further for executing instructions from the memory to group the independent application with the host application when the comparison of current status of the second window to the stored window status of the independent application and the stored window status of the host application indicates that the second window status has changed and that a parameter associated with the second window is within a threshold metric of a corresponding parameter of the first window.

12. A method for managing windows in a computer system comprising at least one display, at least one user interface and a processor executing instructions from a memory, comprising:
   loading a host application into memory and displaying a first window associated with the host application in the user interface;
   detecting an input to the host application to launch an independent application that is grouped with the host application;
   launching the independent application and displaying a second window associated with the independent application in the user interface in accordance with one or more of stored window location or stored window size information referenced by the host application within the memory;
   detecting an operation being applied by a user to either of the first window associated with the host application or the second window associated with the independent application; and
   applying the operation to at least the other of the first window associated with the host application or the second window associated with the independent application,
   wherein the operation is selected from the group consisting of moving, minimizing, maximizing, restoring, and closing the respective applications.

13. The method of claim 12, the at least one display for selectively displaying the first window associated with the host application and the second window associated with the independent application.

14. The method of claim 12, further comprising providing a launch button in association with the host application for launching the independent application.

15. The method of claim 12, further comprising providing a launch button in association with the host application for launching an independent application that is not grouped with the host application.

16. The method of claim 12, further comprising referring to scaling variables stored in the memory in implementing a user applied minimizing or maximizing operation.

17. The method of claim 12, further comprising detecting an independent application disassociation command being applied by the user and to ungroup the independent application from the host application in response thereto.

18. The method of claim 17, wherein the independent application disassociation command is detected in response to the user depressing a predefined key on a keyboard and simultaneously moving the window associated with the independent application.

19. The method of claim 12, further comprising storing a window status of each of the first window and the second window.

20. The method of claim 19, wherein the window status is selected from at least one of the group consisting of the size, the position, and the activity of the respective window.

21. The method of claim 19, further comprising comparing the current status of the first window or the second window to a respective stored window status.

22. The method of claim 21, further comprising grouping the independent application with the host application when the comparison of current status of the second window to the stored window status of the independent application and the stored window status of the host application indicates that the second window status has changed and that a parameter associated with the second window is within a threshold metric of a corresponding parameter of the first window.

* * * * *